United States Patent Office 3,465,041
Patented Sept. 2, 1969

3,465,041
ADAMANTYL GLYOXALS
Jack Bernstein, New Brunswick, N.J., assignor to E. R. Squibb & Sons, Inc., New York, N.Y., a corporation of Delaware
No Drawing. Continuation-in-part of application Ser. No. 448,289, Apr. 15, 1965. This application Feb. 23, 1968, Ser. No. 707,419
Int. Cl. C07c 49/26, 49/80
U.S. Cl. 260—586          9 Claims

ABSTRACT OF THE DISCLOSURE

This invention relates to 1-adamantylglyoxal and 3- and/or 5-substituted 1-adamantylglyoxals which are useful as antiviral agents.

This application is a continuation-in-part of application Ser. No. 448,289, filed Apr. 15, 1965, now U.S. Patent No. 3,379,754.

SUMMARY OF THE INVENTION

This invention relates to 1-adamantylglyoxals of the formula

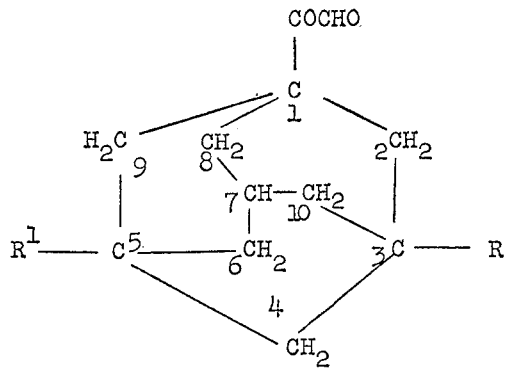

wherein R and $R^1$ each is hydrogen, halo, lower alkyl, phenyl or lower alkoxy.

The halogen substituents represented by the various symbols R include chlorine, bromine, iodine and fluorine but the first two are preferred. Lower alkyl groups represented by these symbols include straight and branched chain aliphatic groups such as methyl, ethyl, propyl, isopropyl, butyl, isobutyl, t-butyl, amyl, isoamyl and the like. The lower alkoxy groups are ether groups having alkyl groups of the foregoing character attached to the oxygen.

The new compounds of Formula I are produced by reacting a 1-adamantanecarboxylic acid having one or two of the substituents R or $R^1$ with thionyl chloride, preferably by heating up to about reflux temperature, whereby the corresponding unsubstituted or substituted 1-adamantanecarbonyl chloride is obtained. The carbonyl chloride is converted to an alkyl 3-(1-adamantyl)-3-ketopropionate by reacting with a dialkyl malonate such as diethylmalonate and magnesium in anhydrous medium, e.g., benzene, alcohol, etc., preferably with heating, e.g., up to about reflux temperature.

The ketopropionate, upon treatment with acetic acid and sulfuric acid, releases carbon dioxide and is converted to the methyl 1-adamantyl ketone. Aluminum bromide and bromine, preferably in an anhydrous solvent such as ether, in the cold, halogenate the ketone to the bromomethyl 1-adamantyl ketone.

The bromomethyl 1-adamantyl ketone is then converted to the glyoxal of Formula I either by treatment with dimethylsulfoxide, e.g., at about room temperature, or alternatively, by oxidation of the methyl 1-adamantyl ketone with selenium dioxide, e.g., in an inert organic medium such as dioxane.

The substituted or unsubstituted 1-adamantylglyoxal of Formula I may be converted to a derivative such as an alkali metal bisulfite addition product, for example, by reaction with sodium bisulfite.

Suitable starting materials for the procedure described above include for example, 1-adamantanecarboxylic acid, 3-methyl-1-adamantanecarboxylic acid, 3-phenyl-1-adamantanecarboxylic acid, 3-methoxy-1-adamantanecarboxylic acid, 3-fluoro, 3-chloro-, 3-bromo- and 3-iodo-1-adamantanecarboxylic acid, 3,5-dimethyl-1-adamantanecarboxylic acid, and the like.

The new compounds of this invention are useful as antiviral agents, e.g., against influenza virus such as APR8 or heptatic virus such as $MHV_3$. They may be administered orally or parenterally to animal species such as mice or monkeys infected by the virus by incorporating an adequate therapeutic dose thereof, e.g., about 5 to about 500 mg., preferably 25 to 250 mg. (i.e., about 10 to 50 mg./kg. in up to four daily doses) in tablets, caspules, elixirs, injectables or the like along with conventional carriers, excipients, vehicles, lubricants, etc., according to accepted pharmaceutical practice.

The following examples are illustrative of the invention. All temperatures are on the centigrade scale.

Example I.—Preparation of 1-adamantylglyoxal (a) Preparation of 1-adamantanecarboxylic acid chloride.—Ten grams of 1-adamantanecarboxylic acid and 20 ml. of thionyl chloride are heated under reflux for thirty minutes. The excess thionyl chloride is removed by distillation under reduced pressure. To remove the last traces of thionyl chloride, 10 ml. of anhydrous benzene is added to the residue and the benzene removed by distillation under reduced pressure. The residue crystallizes upon cooling and is obtained in quantitative yield. The 1-adamantanecarboxylic acid chloride is used in (b) without further purification.

(b) Preparation of bromomethyl 1-adamantyl ketone.—In a three-necked flask fitted with a stirrer, reflux condenser and dropping funnel there is placed 3.6 grams of magnesium turnings (activated with iodine), 11 ml. of anhydrous benzene and 1 ml. of absolute ethanol. The mixture is heated to initiate reaction. To this mixture there is then added dropwise a solution of 24.0 grams of diethyl malonate in 7 ml. of absolute alcohol and 30 ml. of anhydrous benzene. The rate of addition is controlled so as to maintain gentle reflux. When the addition is completed, the reaction mixture is refluxed until the magnesium is completely dissolved. The excess alcohol is then removed by distillation, through a short glass helices-packed column, as the azeotrope with benzene.

To the diethyl ethoxymagnesium malonate there is added with cooling and with vigorous stirring, a solution of 19.8 grams of 1-adamantanecarboxylic acid chloride (see (a)) in 30 ml. of anhydrous benzene over the course of 30–40 minutes. The reaction mixture is then refluxed for one hour and poured onto crushed ice. Dilute sulfuric acid is added to dissolve the precipitated solid. The benzene layer is separated, washed with water and dried over anhydrous sodium sulfate. The benzene and unreacted diethyl malonate are removed by distillation, first at atmospheric pressure and finally under reduced pressure. The residue is then distilled under reduced pressure and boils at 108–110° at 0.06 mm. The ethyl 3-(1-adamantyl)-3-ketopropionate thus obtained is dissolved in a mixture of 50 ml. of acetic acid, 30 ml. of water and 5.5 ml. of concentrated sulfuric acid and refluxed for 3–4 hours until the evolution of carbon dioxide has ceased. The mixture is then cooled and poured into 300 ml. of ice water. The methyl 1-adamantyl ketone precipitates as an oil which crystallizes rapidly. It melts at 53–54°, after recrystallization from aqueous methanol.

A solution of 8.9 grams of methyl 1-adamantyl ketone in 20 ml. of anhydrous ether is cooled in an ice bath, 200 mg. of aluminum bromide added and then 8 grams of bromine added dropwise with vigorous stirring. The bromine color disappears almost instantaneously. Water is then added to the reaction mixture and ether added to dissolve the precipitated solid. The ether layer is separated, dried over anhydrous sodium sulfate and concentrated to yield the desired bromomethyl 1-adamantyl ketone as a solid, melting at 78–79°.

(c) Preparation of 1-adamantylglyoxal.—A solution of 15 grams of bromomethyl 1-adamantyl ketone in 100 ml. of dimethyl sulfoxide is allowed to stand at room temperature for ten hours. The reaction mixture is then poured into ice water and extracted with diethyl ether. The ether extracts are washed with water and dried over anhydrous magnesium sulfate. Removal of the ether under reduced pressure yields the desired 1-adamantylglyoxal.

Example 2.—Alternate preparation of 1-adamantylglyoxal

A solution of 1.55 grams of selenium dioxide in 10 ml. of ninety percent aqueous dioxane is warmed to 70° and a solution of 1.78 grams of methyl 1-adamantyl ketone in 15 ml. of dioxane added. The mixture is refluxed for five hours and then filtered hot to remove the selenium. Upon cooling and concentration of the dioxane there is obtained the desired 1-adamantylglyoxal.

Example 3.—Preparation of 1-adamantylglyoxal, monosodium bisulfite addition product A solution of 1.92 grams of 1-adamantylglyoxal in 100 ml. of ethanol is poured into 200 ml. of a 1.5 percent aqueous sodium bisulfite solution. After standing overnight, the crystals which separate are collected, and washed with cold water to give the desired monosodium bisulfite addition product.

Example 4.—Preparation of 3-methyl-1-adamantylglyoxal

By substituting 3-methyl-1-adamantanecarboxylic acid for the 1-adamantanecarboxylic acid in the procedure of Example 1(a) but otherwise following that example, the desired product is obtained.

Example 5.—Preparation of 3-phenyl-1-adamantylglyoxal

By substituting 3-phenyl-1-adamantanecarboxylic acid for the 1-adamantanecarboxylic acid in the procedure of Example 1(a) but otherwise following that example, the desired product is obtained.

Example 6.—Preparation of 3-methoxy-1-adamantylglyoxal

By substituting 3-methoxy-1-adamantanecarboxylic acid for the 1-adamantanecarboxylic acid in the procedure of Example 1(a) but otherwise following that example, the desired product is obtained.

Example 7.—Preparation of 3-fluoro-1-adamantylglyoxal

By substituting 3-fluoro-1-adamantanecarboxylic acid for the 1-adamantanecarboxylic acid in the procedure of Example 1(a) but otherwise following that example, the desired product is obtained.

3-iodo-, 3-chloro-, and 3-bromo-1-adamantylglyoxal are similarly obtained.

Example 8.—Preparation of 3,5-dimethyl-1-adamantylglyoxal

By substituting 3,5-dimethyl-1-adamantanecarboxylic acid for the 1-adamantanecarboxylic acid in the procedure of Example 1(a) but otherwise following that example, the desired product is obtained.

Example 9.—Preparation of 3-methoxy-5-methyl-1-adamantylglyoxal (a) Preparation of 3-bromo-5-methyl-1-adamantanecarboxylic acid.—To a stirred mixture of 100 ml. of dry bromine and 60 grams of anhydrous aluminum bromide, cooled to 0°, there is added over the course of 4 hours 32.5 grams of dry, powdered 3-methyl-1-adamantanecarboxylic acid. The reaction mixture is allowed to stand at 0–10° for 48 hours and then warmed to room temperature. After 5 hours the reaction mixture is poured onto 500 grams of finely chopped ice and 500 ml. of benzene added. The excess bromine is removed by treatment with solid sodium pyrosulfite until the bromine color disappears, the temperature of the mixture being kept at 0–10° during this treatment.

The benzene layer is separated and the aqueous phase extracted twice with benzene. The combined benzene extracts are washed with water and then extracted twice with 250 ml. of N sodium hydroxide solution. The combined alkaline solutions are extracted with ether and then acidified with 2 N sulfuric acid solution. After several hours the precipitate is filtered, air dried and crystallized from cyclohexane to yield the desired 3-bromo-5-methyl-1-adamantanecarboxylic acid.

(b) Preparation of 3 - methoxy - 5-methyl-1-adamantanecarboxylic acid.—Three grams of 3-bromo-5-methyl-1-adamantanecarboxylic acid is dissolved in 30 ml. of anhydrous methanol and 2.7 grams of dry silver oxide is added. The mixture is stirred under reflux for 6 hours, filtered and the solvent removed by distillation under reduced pressure. The residue is crystallized from cyclohexane to yield the desired 3-methoxy-5-methyl-1-adamantanecarboxylic acid.

(c) Preparation of 3-methoxy-5-methyl-1-adamantylglyoxal.—By then substituting 3-methoxy-5-methyl-1-adamantanecarboxylic acid for the 1-adamantanecarboxylic acid in the procedures of Example 1(a) but otherwise following that example, 3-methoxy-5-methyl-1-adamantylglyoxal is obtained.

What is claimed is:
1. A compound of the formula

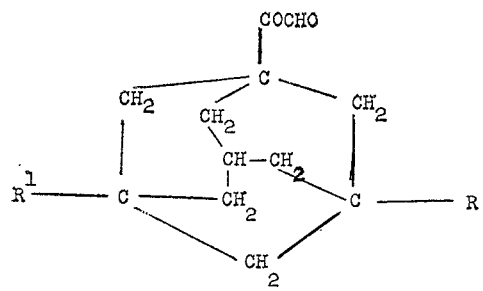

wherein R and $R^1$ each is a member of the group consisting of hydrogen, halo, lower alkyl, phenyl and lower alkoxy.

2. A compound as in claim 1 wherein R is lower alkyl and R¹ is hydrogen.

3. A compound as in claim 1 wherein R is halo and R¹ is hydrogen.

4. A compound as in claim 1 wherein R is lower alkyl and R¹ is hydrogen.

5. A compound as in claim 1 wherein R and R¹ each is lower alkyl.

6. A compound as in claim 1 wherein R and R¹ each is hydrogen.

7. A compound as in claim 2 wherein the lower alkyl group is methyl.

8. A compound as in claim 3 wherein the halogen is chlorine.

9. A compound as in claim 1 wherein R is phenyl and R¹ is hydrogen.

References Cited

UNITED STATES PATENTS 3,258,498  6/1966  Schneider _____ 260—586

LEON ZITVER, Primary Examiner

M. M. JACOB, Assistant Examiner

U.S. Cl. X.R.

260—468, 469, 503, 514, 544, 590, 999